United States Patent
Eiriksson et al.

(10) Patent No.: US 8,621,627 B1
(45) Date of Patent: Dec. 31, 2013

(54) INTRUSION DETECTION AND PREVENTION PROCESSING WITHIN NETWORK INTERFACE CIRCUITRY

(75) Inventors: Asgeir Thor Eiriksson, Sunnyvale, CA (US); Wael Noureddine, Mountain View, CA (US); Anamaya Sullerey, Santa Clara, CA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 589 days.

(21) Appl. No.: 12/704,884

(22) Filed: Feb. 12, 2010

(51) Int. Cl.
*H04L 29/06* (2006.01)

(52) U.S. Cl.
USPC ............................................. 726/23; 709/250

(58) Field of Classification Search
USPC ........................................................ 709/250
See application file for complete search history.

(56) References Cited

U.S. PATENT DOCUMENTS

| | | | |
|---|---|---|---|
| 6,594,268 B1 | 7/2003 | Aukia et al. | |
| 6,717,946 B1 | 4/2004 | Hariguchi et al. | |
| 6,792,502 B1 | 9/2004 | Pandya et al. | |
| 6,798,743 B1 | 9/2004 | Ma et al. | |
| 7,031,267 B2 | 4/2006 | Krumel | |
| 7,408,883 B2 * | 8/2008 | Deragon et al. | 370/249 |
| 7,474,670 B2 | 1/2009 | Nowshadi | |
| 7,583,596 B1 | 9/2009 | Frink | |
| 7,660,306 B1 | 2/2010 | Eiriksson et al. | |
| 7,899,864 B2 * | 3/2011 | Margulis | 709/204 |
| 7,925,795 B2 * | 4/2011 | Tamir et al. | 709/250 |
| 2002/0039366 A1 | 4/2002 | Sano | |
| 2004/0003094 A1 | 1/2004 | See | |
| 2004/0213235 A1 | 10/2004 | Marshall et al. | |
| 2005/0083935 A1 | 4/2005 | Kounavis et al. | |
| 2005/0135378 A1 | 6/2005 | Rabie et al. | |
| 2005/0135396 A1 | 6/2005 | McDaniel et al. | |
| 2005/0135412 A1 | 6/2005 | Fan | |
| 2005/0289246 A1 | 12/2005 | Easton et al. | |
| 2006/0075480 A1 * | 4/2006 | Noehring et al. | 726/12 |
| 2006/0080733 A1 | 4/2006 | Khosmood et al. | |
| 2006/0133267 A1 | 6/2006 | Alex et al. | |
| 2006/0206300 A1 | 9/2006 | Garg et al. | |
| 2006/0209693 A1 | 9/2006 | Davari et al. | |
| 2006/0221832 A1 | 10/2006 | Muller et al. | |
| 2006/0281451 A1 | 12/2006 | Zur | |
| 2007/0070901 A1 | 3/2007 | Aloni et al. | |
| 2009/0254990 A1 * | 10/2009 | McGee | 726/22 |

OTHER PUBLICATIONS

"*Cisco Security Solutions*," Quick Reference Guide for Customers, Jan. 2009, 31 pages.

"*Cisco Nexus 1000V Series Switches*," Data Sheet, 2009, 14 pages.

(Continued)

*Primary Examiner* — Kambiz Zand
*Assistant Examiner* — Ghodrat Jamshidi
(74) *Attorney, Agent, or Firm* — Beyer Law Group LLP (57) ABSTRACT

A network interface controller (NIC) is configured to couple a host to a network. The NIC coupled to the host via a host bus, and the host is configured to operate a plurality of virtual machines. The NIC is configured to receive at least one data frame, the at least one data frame including at least a source network address and indication of at least one destination network address; determine if the received data frame is a frame on which additional processing should occur; based on a result of the determining step, cause the frame to be provided to the host, via the host bus, for the host to perform the additional processing; and receive, via the host bus, the frame on which additional processing has been performed and steer the frame to a destination based on the at least one destination address.

29 Claims, 7 Drawing Sheets

(56) References Cited

OTHER PUBLICATIONS

"*VMware Virtual Networking Concepts*," Information Guide, VMware Inc., 2007, 12 pages.
Office Action in U.S. Appl. No. 11/250,894, mailed Jun. 26, 2008.
Office Action in U.S. Appl. No. 11/250,894, mailed Jan. 26, 2009.
Office Action in U.S. Appl. No. 11/250,894, mailed Sep. 15, 2009.
Notice of Allowance in U.S. Appl. No. 11/330,898, mailed Sep. 23, 2009.
Allowed Claims in U.S. Appl. No. 11/330,898.
Office Action in U.S. Appl. No. 11/130,898 mailed Apr. 2, 2009.
Office Action in U.S. Appl. No. 11/330,898, mailed Oct. 8, 2008.

\* cited by examiner

| INGRESS FILTER RULE | STEER TO |
|---|---|
| (*,from port=0,1,2,3,oVLAN_vld=x) | IDS |
| (*,from port=4,5,6,7,oVLAN_vld=1) | IDS, rm oVLAN |

Fig. 7

INTRUSION DETECTION AND PREVENTION PROCESSING WITHIN NETWORK INTERFACE CIRCUITRY

BACKGROUND

The present invention is in the field of server virtualization and, more particularly, includes an intelligent network interface controller architecture which can efficiently process data traffic involving virtual machines operating on a physical host machine.

Virtual machine environments are becoming popular. In particular, a virtual machine environment allows multiple virtual machines operating on a host machine to share the physical resources of the host machine. The sharing of physical resources is made possible by a hypervisor, which is a software application that, generally, is aware of all data traffic that is sourced from or destined to the virtual machines (also generally referred to as a guest operating system or virtual image) and is also aware of all memory usage by the virtual machines.

One general concern in networked computing environments has been with detecting intrusions that may interfere with operation of the computer system. Such intrusion detection may include, for example, the use of deep packet inspection of data traffic destined to the computer system. In a virtual machine environment, such intrusion detection may be conventionally handled as part of the hypervisor.

Another challenge in virtual machine environments is switching data traffic that is sourced from one virtual machine, operating on the host machine, to other virtual machines also operating on that host machine. A conventional method of switching such traffic utilizes a virtual switch, which is a software component operating on the host machine that allows virtual machines on the same host to communicate with each other using the same protocols that would be used over physical switches, without the need for additional networking hardware. However, it is known that such a software virtual switch can be a performance bottleneck.

One proposed solution to the performance bottleneck of the software virtual switch is to employ an appliance that is connected outside the host machine on which the virtual machines are operating. That is, the appliance is part of the network hardware. In addition, it has also been proposed that intrusion detection may be performed by this switching appliance. However, by employing an appliance that is outside the host machine, communication between the appliance and the host machine may add undesirable latency in communication involving the virtual machines.

SUMMARY

A network interface controller (NIC) is configured to couple a host to a network. The NIC coupled to the host via a host bus, and the host is configured to operate a plurality of virtual machines. The NIC is configured to receive at least one data frame, the at least one data frame including at least a source network address and indication of at least one destination network address; determine if the received data frame is a frame on which additional processing should occur; based on a result of the determining step, cause the frame to be provided to the host, via the host bus, for the host to perform the additional processing; and receive, via the host bus, the frame on which additional processing has been performed and steer the frame to a destination based on the at least one destination address.

DETAILED DESCRIPTION

The inventors have realized that, in a virtual machine environment, it can be very efficient to offload a switching function to a network interface controller such that, in the process, some of the intrusion detection processing may be offloaded from host resources. For example, in accordance with one aspect, the network interface controller may be configured for filter processing such that at least some frames need not even be provided to host-based intrusion detection processing. In accordance with some embodiments, the configuration of network interface controller filter processing may be accomplished wholly or in part dynamically, such as by the host-based intrusion detection processing or wholly by intrusion detection processing on the network interface controller itself.

The host-based intrusion detection processing may be, for example, carried out by a virtual machine operating on the host. In addition, the filter processing within the NIC may function to appropriately steer frames that are to be provided to and are provided from the virtual machine intrusion detection processing to other virtual machines or to one or more peer devices.

Figure 1:
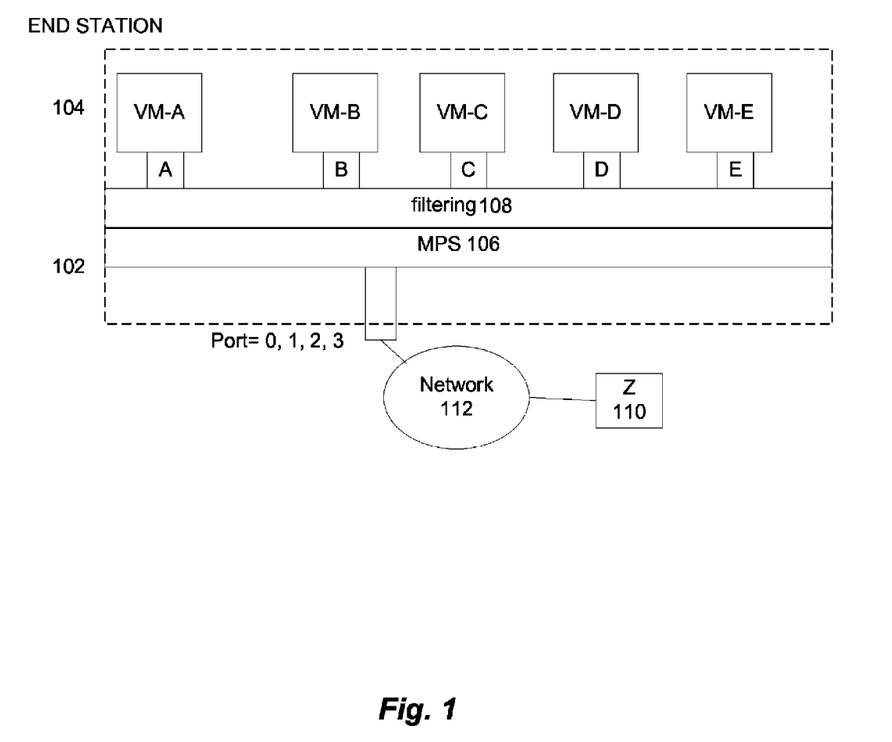
FIG. 1 is a block diagram that broadly illustrates an architecture of a NIC 102 that is interoperating with a host machine 104.

FIG. 1 is a block diagram that broadly illustrates an architecture of a NIC 102 that is interoperating with a host machine 104. Among various virtual machines VM-IDS, VM-B, VM-C, VM-D and VM-E operating on the host machine 104, the virtual machine VM-IDS is operating to perform intrusion detection processing on behalf of the other virtual machines operating on the host machine 104. (VM-IDS is shown to be at Ethernet address "A" and, so, VM-IDS is sometimes referred to herein as VM-A.) As will be discussed in greater detail below, the NIC 102 includes multi-purpose switch (MPS) functionality 106 that may, among other operations, operate to accomplish switching of traffic among the various virtual machines. The virtual machines may communicate with each other (i.e., to pass data among the virtual machines), typically via the NIC 102, or the virtual machines may communicate with a peer Z 110 via the NIC 102 and a network 112. The host machine 104 may be multiple server blades.

In conjunction with switching traffic that has been provided from one of the various virtual machines (including traffic to or from the peer 110), filter functionality 108 may operate to ensure (in a way that may be configurable) that ingress data frames to an ultimate destination virtual machine (which may have been egress frames from a different virtual machine) are processed for intrusion detection prior to being provided to the ultimate destination virtual machine(s). More particularly, in the ingress direction, the filter functionality 108 operates in conjunction with the MPS functionality 106 to ensure that data frames destined to an ultimate destination virtual machine (or, at least, data frames originating from a non-trusted source) are first provided to the VM-A operating on the host machine to be processed for intrusion detection. (The MPS functionality 106 can be configured such that, for example, frames that would otherwise be replicated to be provided to various destination VM's, and possibly to the peer device Z, such as frames for broadcast or multicast, are not replicated until after intrusion detection processing has been performed.) Some frames that do not meet even a threshold condition for intrusion detection, as characterized by rules upon which the filter functionality 108 is operating, may be dropped by the NIC 102 and thus never even provided to the VM-A for intrusion detection.

For example, the filter functionality 108 may be operating as described in U.S. patent application Ser. No. 11/250,894, filed Oct. 13, 2005 and entitled "Filtering Ingress Packets In Network Interface Circuitry." (U.S. patent application Ser. No. 11/250,894 is incorporated herein, in its entirety, for all purposes.) More particularly, for example, the filter functionality 108 may apply one or more accept/reject actions to each frame and, further, may optionally apply additional filtering rules to frames that are accepted, such as modifying the frame.

For example, then, the accept/reject actions applied to the frames by the filter functionality to ingress frames may be an application of firewall-type rules, such as rejecting frames that originate from particular IP addresses. Accepted frames may then be steered to the VM-A operating on the host machine, for more sophisticated processing and application of more sophisticated intrusion protection processing, such as including deep packet inspection in attempt to detect illegal or unauthorized activity. The filter rules may be configurable by, for example, the intrusion detection processing and/or otherwise.

It is also noted that, in some embodiments, the NIC is also able to perform a protocol offload function, such as offloading TCP/IP processing from an operating system of a source or destination VM. In such cases, generally, the MPS functionality 106 and filter functionality 108 selectively cause accomplishment of intrusion protection so that the intrusion protection is carried out before the protocol offload processing (for ingress data), as appropriate. That is, the operation of the MPS functionality 106 and filter functionality 108 in this context may be generally agnostic as to where the protocol functionality is operating, either in the operating system or being offloaded to the NIC. It is further noted that, generally, even communication between VM's is via a network protocol such as TCP/IP, even if the VM's are executing on the same host machine. Thus, for example, in such a situation, the NIC 102 and/or a VM may perform protocol processing functionality in one or both of the egress path (to encapsulate the data for transmission) and the ingress path (to process and remove the headers for receipt of the data).

Generally, when the MPS functionality 106 is encountered by a frame that has not yet been provided to the VM-A for intrusion detection processing, and the source of the frame is a source the MPS functionality 106 is not configured to recognize as a trusted source, the MPS functionality 106 recognizes this condition and does not (yet) replicate the frames without first providing the frames to VM-A for intrusion protection, even if the frames are otherwise designated as multicast or broadcast frames. (It is possible, though, that the MPS functionality 106 may operate to allow the frame to be provided to the peer Z without first being provided to the VM-A for intrusion detection processing.) On the other hand, when the MPS functionality 106 is encountered by a frame that already been provided to the VM-A for intrusion detection processing, the MPS functionality 106 may operate to recognize this condition and, if applicable, replicate the frames for multicast or broadcast. In general, the condition that is recognized is, in fact, the absence of the condition that would otherwise cause the frame to be provided to the VM-A for intrusion detection processing. Furthermore, in general, the VM-A appears to be the original sender since the VM-A is using the SA of the original sending VM when providing a frame after intrusion detection processing. Thus, for example, processing in the host driver or in the NIC 102 firmware or hardware ensures, for multicast or broadcast frames, that the original sending VM is not also a destination of the multicast or broadcast frames. In one example, the MPS functionality 106 replicates the frame and the replicated frame may be provided to the ingress pipeline of the original sending VM. However, filtering functionality in the ingress pipeline to the original sending VM recognizes that the frame would be destined to the original sending VM and blocks the frame from being provided back to the original sending VM.

The general concepts discussed above will become clearer with a discussion of three particular embodiments, which we designate herein as Embodiment 1, Embodiment 2, Embodiment 3, and Embodiment 4. In Embodiment 1, the steering of a frame in the NIC is based on the port from which that frame originates. In Embodiment 2, the steering of a frame in the NIC is based on the port from which that frame originated and, for frames that originated from a VM on the host machine 104, on the presence or absence of a particular tag in the frame. As an example, the tag may be an oVLAN tag which refers to a 4-byte IEEE 802.1 Q-in-Q encapsulation according to Ethernet standards. In Embodiment 3, the steering of a frame in the NIC is based on the port from which the frame originated and, for frames that did not originate from the peer Z, on a destination Ethernet address in the frame. In Embodiment 2, an oVLAN tag is added to all frames that are to be looped back to the VM-A for intrusion detection, and the oVLAN tag is stripped off after intrusion detection is applied. Embodiment 3 employs the filtering functionality in conjunction with MAC-in-MAC encapsulation, in which the Ethernet header of a frame is encapsulated within an additional Ethernet header to cause the frame to be steered to the VM-A for intrusion detection. In Embodiment 4, the steering of a frame in the NIC is based on the port from which the frame originated and, for frames that did not originate from the peer Z, on prefix information in the front of such an Ethernet frame.

Figure 2:
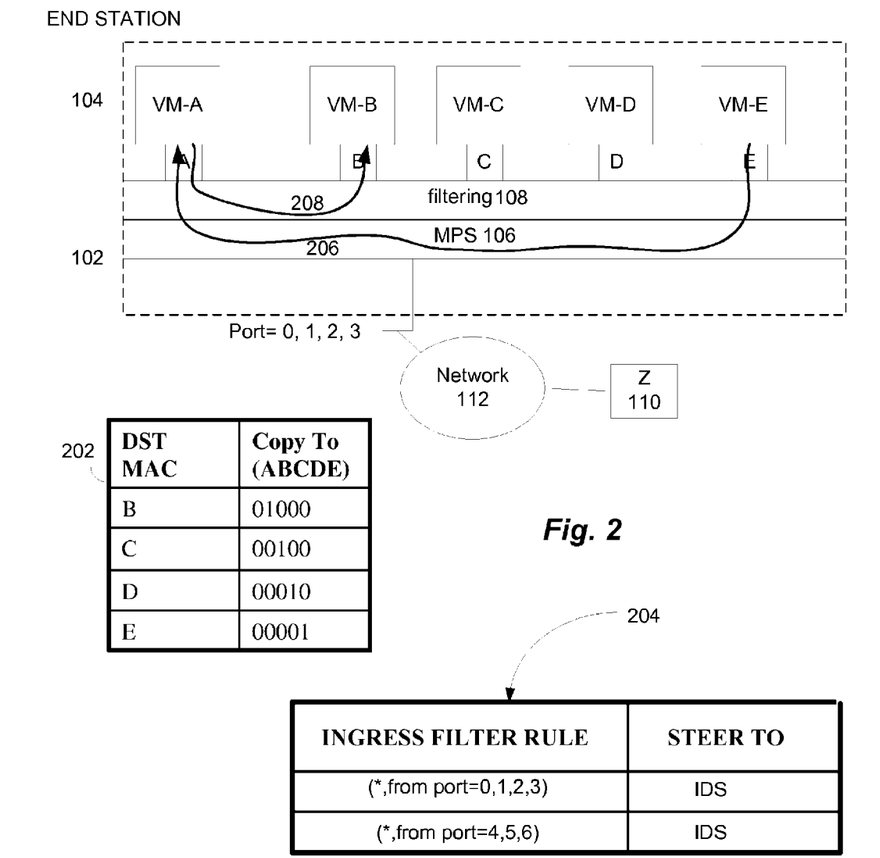
FIG. 2 illustrates a scenario in which VM-A is configured on port 7, such that the VM-A is the only VM on port 7 and, thus, is the only VM sending from port 7.

We now discuss Embodiment 1 in greater detail, relative to several different scenarios of operation, the first of which is illustrated in FIG. 2. In the FIG. 2 example, the VM-A (which is configured to perform intrusion detection) is configured on port 7, such that the VM-A is the only VM on port 7 and, thus, is the only VM sending from port 7. The other VM's are each on one of ports 4, 5 and 6 (a port can be shared). Ports 0, 1, 2 and 3 are physical Ethernet ports.

In general, in accordance with Embodiment 1, ingress frames from peer Z and egress frames from one of the VM's other than VM-A are steered to the VM configured to perform intrusion detection—VM-A in the FIG. 2 example. As a frame egresses from a VM other than VM-A, and the frame goes through the processing pipeline on the NIC 102, the filtering functionality 108 may be configured to operate, according to rules not shown, to perform egress filtering such as access control list processing based on looking up a tuple with several components, such as SA and VLAN, and dropping a frame if the source VM is not using a valid SA and VLAN.

In the MPS functionality 106, the frame that passes the filter functionality 108 in the egress direction, as just described, is then processed to determine, from the source of the frame, whether the frame is to be replicated based on the DA indication or whether replication is to be suppressed because the frame has not yet been provided to the VM-A for intrusion detection. For frames whose DA indication includes an indication that the frame is to be provided to the Peer Z, the MPS functionality 106 may be selectively configured to either cause two frames to be sent—one with destination of port 0, 1, 2 or 3 which will then go to Peer Z and another to VM-A for intrusion detection—or can cause one frame to be sent to VM-A for intrusion detection, which will then be caused to be provided to Peer Z after intrusion detection, as the frame is also being potentially replicated to be provided to various destination VM's operating on the host 104.

In the initial instance, where the frame has not yet been provided to the VM-A for intrusion detection, the filtering functionality 208 operates according to the filtering rules 204 to cause the frame to be steered to VM-A for intrusion detection processing.

The frame that has already been provided to VM-A for intrusion detection processing is recognized, by the MPS functionality 206 as discussed above, as having a source that is the VM-A, and the MPS functionality 206 operates according to the DST MAC indication, as indicated by the MPS rules 202, to appropriately replicate the frame. The filtering functionality 208 does not steer the frames to VM-A, since the source port is port 7, and the frame is thus provided to the appropriate destination VM-A.

Turning now to the specific example of Embodiment 1 illustrated by FIG. 2, this figure illustrates an example of a unicast loopback scenario for Embodiment 1, where the source VM is VM-E and the destination VM is VM-B. The frame (denoted by arrow 206) from VM-E has a source port of 4 and, thus, is indicated by the filter rules 204 as to be steered to the VM-A for intrusion detection processing. The MPS functionality 206 thus causes the packet to be steered to the VM-A. Once intrusion detection processing has been performed on the frame by VM-A, the frame is provided back from the VM-A (arrow 208), and the MPS rules 202 cause the frame to be copied to port B (VM-B). None of the filter rules 204 apply in this case of egress from VM-A since the frame is provided from port 7.

Figure 3:
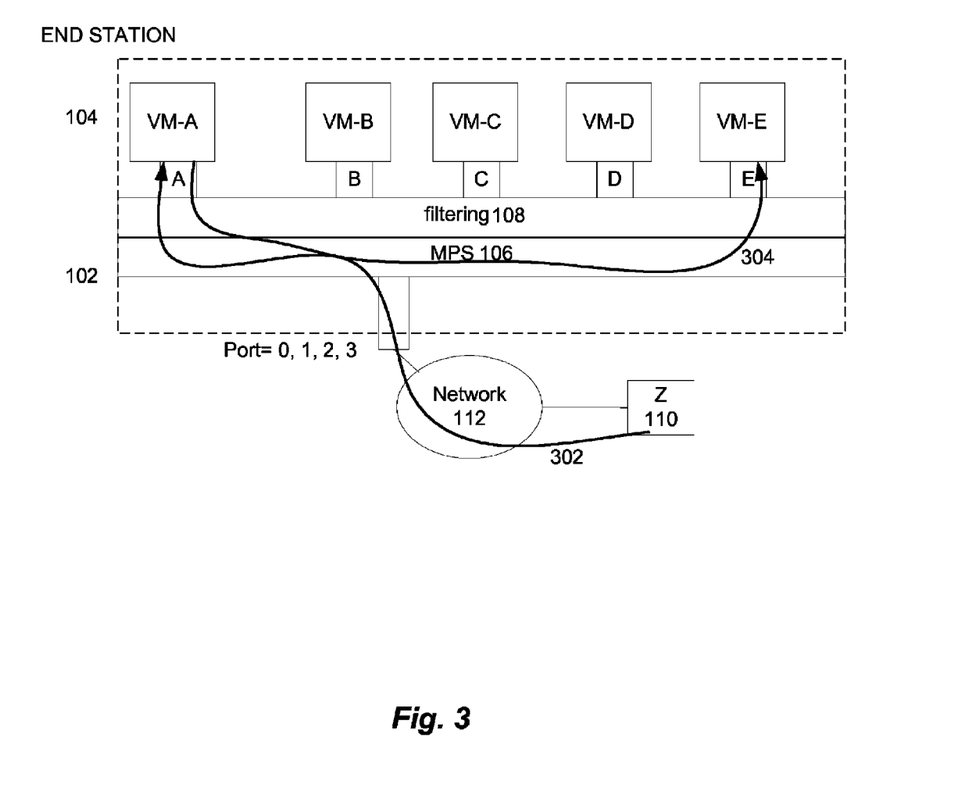
FIG. 3 illustrates an example of a unicast ingress scenario for Embodiment 1, where the source is Z (the peer) and the destination VM is VM-E.

FIG. 3 illustrates an example of a unicast ingress scenario for Embodiment 1, where the source is Z (the peer) and the destination VM is VM-E. The filter rules 204 include a line to steer the frame (from any of ports 0, 1, 2, or 3) to the VM-A. Similar to the unicast loopback scenario, once the intrusion detection processing has been performed on the frame, the frame is provided to the VM-E based on the destination address of VM-E.

Figure 4:
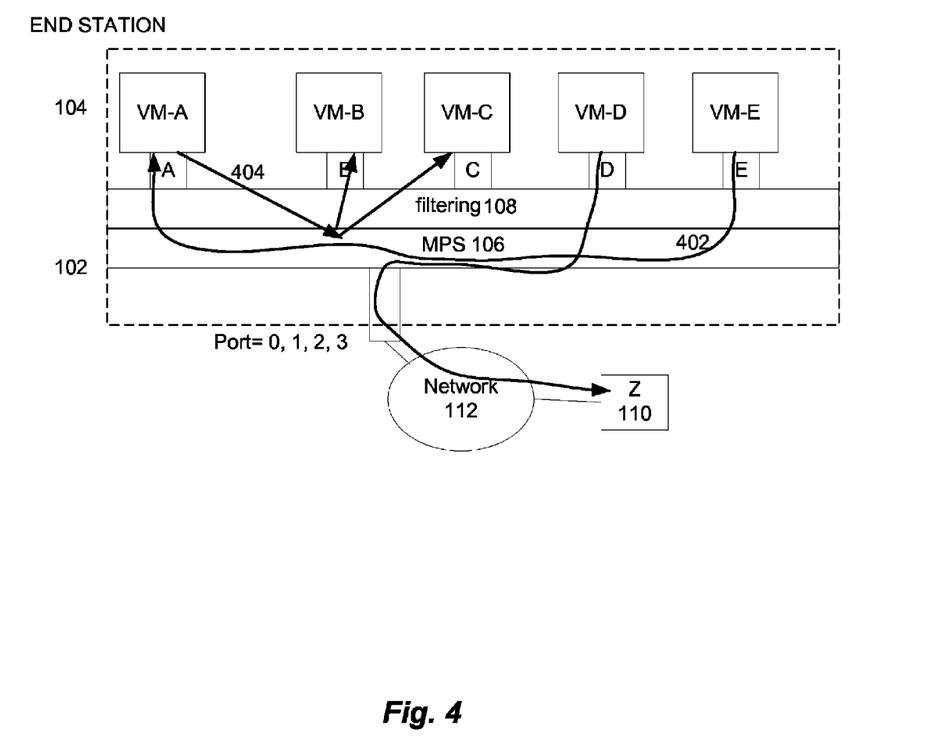
FIG. 4 illustrates an example of a broadcast egress scenario for Embodiment 1, where the source is VM-E.

FIG. 4 illustrates an example of a broadcast egress scenario for Embodiment 1, where the source is VM-E. The multicast scenario would be similar, except that it would also include determining the VM's that have joined the appropriate multicast group. The frame from VM-E has a source port of 4 and, thus, is steered by one of the filter rules 204 to the VM-A. Once intrusion detection processing has been performed on the frame, the frame is provided back from the VM-A, and the MPS rules 202 causes the frame to be copied to ports B, C and D (VM-B) given the DST MAC indication of "Bcast." None of the filter rules apply since the frame is provided from port 7.

Figure 5:
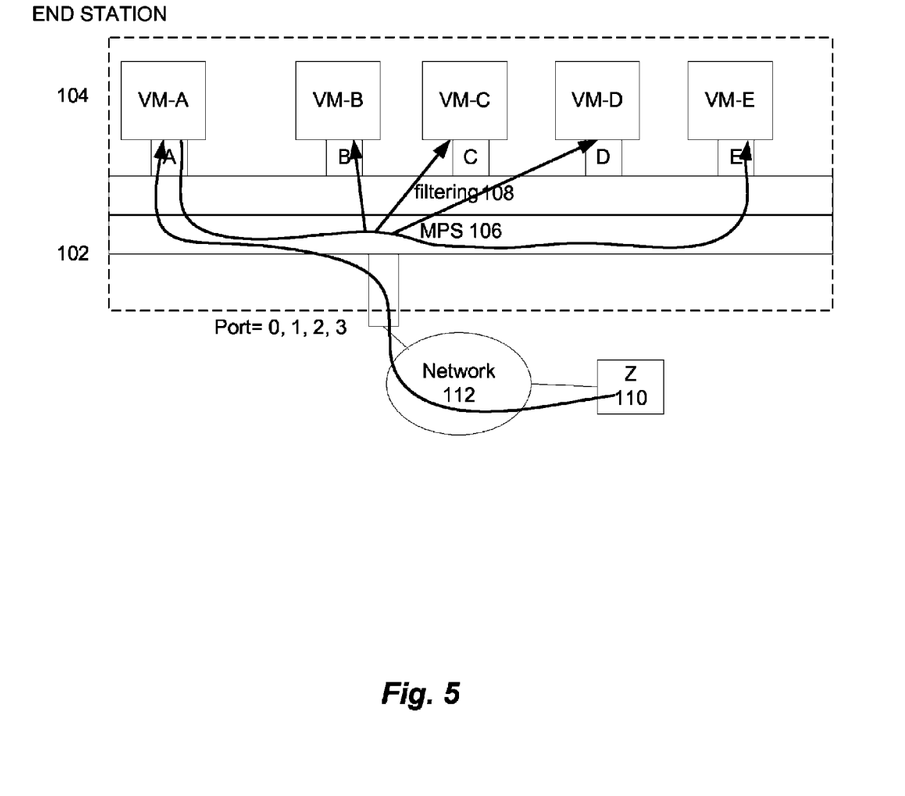
FIG. 5 illustrates an example of a broadcast ingress scenario for Embodiment 1, where the source is Z.

FIG. 5 illustrates an example of a broadcast ingress scenario for Embodiment 1, where the source is Z. Since the frame originates from port 0, 1, 2 or 3, the frame is steered to the VM-A for intrusion detection processing according to the filter rules 204. The frame is then provided from port 7 and caused to be looped back to the VM-B, VM-C, VM-D and VM-E according to the rules 202.

Figure 6:
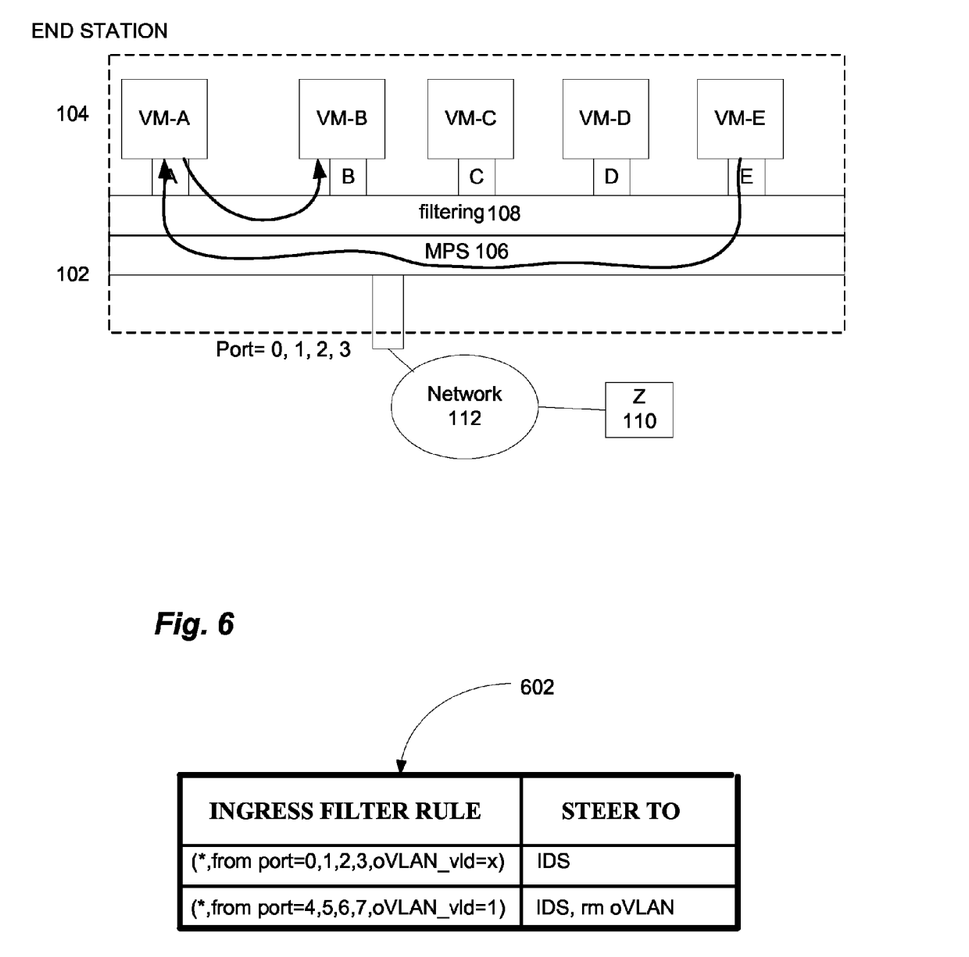
FIG. 6 illustrates the use of an added oVLAN tag to cause a frame to be steered to the VM-A.

By contrast to Embodiment 1, which utilizes source ports as an indication of whether to steer a frame to VM-A for intrusion detection, Embodiment 2 utilizes source ports and potentially an oVLAN tag that may be added to frames, such as by the NIC 102 (e.g., in the NIC 102 firmware) in the egress path from the source VM. In this context, the "firmware" may be, for example, the portion of the NIC 102 functionality that directly communicates with driver software executing on the host machine to receive a work request from the driver software to DMA read egress data from host memory. Thus, for example, as the frame data is being provided from the source VM to the NIC 102, the firmware may cause the oVLAN tag to be inserted into the frame. For example, the firmware may itself insert the oVLAN tag into the frame as immediate data. As another example, the firmware may set an indication (such as a bit) in a message header of the frame such that the hardware, upon recognizing the indication, inserts the oVLAN tag into the frame. For connections for which the NIC 102 has been configured to handle the protocol processing, the firmware may set an indication in the offload state (e.g., a control block which the offload protocol processing employs for protocol processing of the offloaded connection) such that the oVLAN tag is inserted for the offloaded frames that are created by the protocol offload hardware.

Referring to FIG. 6, based on the filter rules 602, if a frame originates from Peer Z (i.e., from port-0, 1, 2, or 3), the presence of an oVLAN tag in the frame is "don't care," since all such frames are to be steered to VM-A for intrusion detection processing. If a frame originates from one of the VM's (i.e., from port 4, 5, 6 or 7) and the oVLAN tag is present, then the frame is steered to VM-A for intrusion detection processing and the oVLAN tag is removed. After the VM-A inspects the frame, the frame is sent back to the NIC without the oVLAN tag and the MPS rules cause the frame to be sent to its intended original destination based on the MPS rules 204. As with Embodiment 1, if the destination is the Peer Z, then the MPS functionality 106 may be configured to send the frame to the peer Z in addition to sending the frame to the VM-A for intrusion detection, or the MPS functionality 106 may cause the frame to be provided to Peer Z after intrusion detection, as the frame is also being potentially replicated to be provided to various destination VM's operating on the host 104.

It is also possible that there is more than one oVLAN tag present in the frame and, in this case, the frame could possibly go to the VM-A for intrusion detection processing as many times as there are oVLAN tags. The portion of the NIC 102 that would otherwise add an oVLAN tag may be configured to not add an oVLAN tag is one is already present. As another example, a particular oVLAN tag value may be used to indicate frames are to be steered to VM-A for intrusion detection processing. It may be difficult, however, to enforce that the particular oVLAN tag value is used only for steering VM-A frames so, in practice, it may be safest just to not support oVLAN tag usage for inter VM communications for machines using Embodiment 2, or to use a locally defined tag format within the NIC.

With regard to Embodiment 2, we now discuss how this embodiment may protect against rogue senders. In particular, since an oVLAN tag is securely added to all loopback frames and it is the oVLAN tag that causes a frame to be steered to the VM-IDS, there is no opportunity for a rogue sender to alter the process. Furthermore, in some examples, if a transmit frame arrives in the NIC firmware with an explicit request to add an oVLAN tag, this request is treated as an error condition, since the NIC firmware should only be able to add an oVLAN tag autonomously. As discussed above, as an optimization, the NIC firmware may have been provided a secure indication that a particular VM sender is trusted, in which case the hardware will not be instructed to insert an oVLAN tag. As a result, the frame replication may occur directly without, according to the filter rules, going through the VM-IDS.

Having discussed Embodiments 1 and 2, we now discuss Embodiment 3. In general, in Embodiment 3, a MAC-in-MAC or other encapsulation is utilized that can be recognized by the MPS and/or filtering functionality in the NIC. For example, an Ethernet header has the format (DA, SA, type+) where DA is the destination Ethernet address, the SA is the source Ethernet address, and the type+ is 4B. The "+" denotes one or more of these types. In Embodiment 2, the resulting format, after adding the oVLAN tag, may be, for example, of the form (DA, SA, ovlan, . . . ) and (DA, SA, ovlan, ivlan, . . . ) and (DA, SA, ivlan, . . . ) and (DA, SA, . . . ) where, as discussed above, ovlan is the outer VLAN tag and ivlan the inner VLAN tag. With regard to Embodiment 3, MAC-in-MAC has the format (DA1, SA1, type1, vlan, DA2, SA2, type2, . . . ). That is, in order to indicate a frame on which intrusion detection processing should take place, the Ethernet header is encapsulated with an additional Ethernet header. As with the oVLAN tag discussed with respect to Embodiment 2, this encapsulation with an additional Ethernet header is performed by the firmware.

Thus, for example, taking the unicast loopback scenario using Embodiment 3, where the source is VM-E and the Destination is VM-B, the NIC 102 firmware may add an additional {$DA_{IDS}$, SA, EtherType} header, where $DA_{IDS}$ is a reserved VM-A address. Thus, when the MPS functionality 106 encounters this frame, the frame is caused to be looped to the VM-A, for intrusion detection processing, based on $DA_{IDS}$. After processing the frame and the frame is provided from the VM-A, the frame is then caused to be sent to VM-B.

Figure 7:
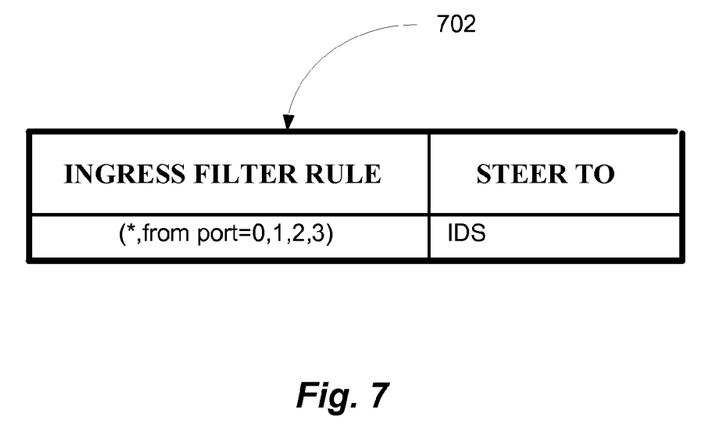
FIG. 7 illustrates a rule that is applied to ingress frames to cause the ingress frame to be steered to the VM-A.

We now describe a unicast ingress scenario using Embodiment 3, and referring to filter rules 702, where the source is the Peer Z and the destination is VM-E. In this scenario, the ingress frame is steered to the VM-A by the ingress filter rules 702 since the frame arrives from the Peer Z on one of Port 0, Port 1, Port 2 and Port 3. After performing intrusion detection processing, the VM-A resends the frames, which are then looped back by the MPS to the destination VM based on the DA of the original frame.

Taking the broadcast egress scenario using Embodiment 3, where the Source is VM-E and the destination is Bcast, as the frame is provided from VM-E, the additional {$DA_{IDS}$,SA, EtherType} header is inserted. As a result, after intrusion detection processing, the frame is sent to VM-B, VM-C and VM-D, as well as to Z. The frame is prevented from going back to VM-E in one example by using the SA E to derive a destination vector that is processed, after the intrusion detection, and prevents the frame from being replicated back to VF E.

We now discuss the broadcast ingress scenario using Embodiment 3, where the source is Z and the destination is Bcast. As with the unicast ingress scenario, the frame is steered to the VM-A by the ingress filter rule 702 since the frame arrives from one of Port 0, Port 1, Port 2 and Port 3. After intrusion detection processing by the VM-A, the MPS causes the frame to be replicated back to the various VM's based on the $DA_{Bcst}$.

Having described various embodiments, we now describe some variations to the described embodiments. For example, in general, it is desirable that frames that are being provided to the NIC 102 from the VM-A of the host 104, after intrusion detection processing, appear to the NIC 102 processing to be originating from the original source of the frame, prior to the intrusion detection processing. In this scenario, generally, processing in the MPS functionality 106 of the NIC 102 determines the ultimate destinations for the frame based on, for example, multicast subscription states being maintained in the NIC 102. However, the lookup processing involved can be computationally expensive such that it can be a drain on the NIC 102 resources.

Thus, in what may be considered an optimization, the device driver operating on the host 104 makes the NIC 102 aware of the original source of a frame based on a characteristic of how the frame is received from the NIC 102. For example, the firmware 103 in the NIC 102 may encode the original source of the frame in the tag value inserted in the frame in embodiment 2 or in the additional MAC header in embodiment 3, which can optionally be used to provide the frame to a destination queue of the VM-A associated with that frame. As the frame then is provided from the VM-A to the NIC 102, after intrusion detection processing, the VM-A may provide the frame to a corresponding queue. Based on the particular queue, the NIC 102 is then aware of the original sender of the frame. Otherwise, as discussed above, the ingress pipeline may be configured to avoid providing a frame to a VM that was the original destination of the frame. Having discussed Embodiments 1-3, we now discuss Embodiment 4 which employs an attribute of the device that the processing pipeline uses a prefix flit/word that is attached in front of every Ethernet frame flowing from the host to the MPS and that the prefix flit/word is also attached in front of every Ethernet frame flowing from the MPS to the host. In the egress direction, the prefix flit/word may contain an explicit indication of replication of broadcast and multi-cast frames, i.e. an indication that the frame is not originating from the VM-A, and an egress frame may contain an explicit indication that it should be steered to the VM-A. In both case, the egress frame prefix flit/word is forwarded to the processing pipeline with specific information when the frame is looped around to the VM-A. This in turn allows the processing pipeline to override other steering action and to steer such a frame to the VM A. The ingress frames in this Embodiment store an indication of the originating port (port 0-3), and this in turn may be used directly to steer frames to the VM-A in the case where a frame originates from an external port.

The Embodiments described above include systems and methods including steering a frame from a network interface device to a virtual machine operating on a host, for intrusion detection processing or other processing. In some examples, the steering may be to processing that is assigned to a control processor on the network interface device itself. Thus, for example, where an Embodiment described above may include a filtering rule to cause a frame to be steered to VM-A for intrusion detection or other processing, in alternative embodiments, the filtering rule may be configured to cause the frame to be steered to processing (such as the control processor) that is partly or entirely local to the network interface device.

We have thus described a method and system to operate, in a virtual machine environment, to offload a switching function to a network interface controller. In the process, intrusion detection or other processing may be offloaded from host resources or, at least, separated from guest operating systems that are an ultimate source or destination of data. The described method and system is compatible with protocol offload processing.

What is claimed is:

1. A network interface controller (NIC) configured to couple a host to a network, the NIC coupled to the host via a host bus, and the host configured to operate a plurality of virtual machines, the NIC configured to:
   receive at least one data frame, the at least one data frame including at least a source network address and indication of at least one destination network address,
   determine if the received data frame is a frame on which additional processing should occur;
   based on a result of the determining step, cause the frame to be provided to the host, via the host bus, for the host to perform the additional processing; and
   receive, via the host bus, the frame on which additional processing has been performed and steer the frame to a destination based on the at least one destination address.

2. The NIC of claim 1, wherein the NIC is further configured to:
   for each received data frame that is a data frame received from one of the virtual machines operated by the host and which is indicated as belonging to a connection for which the NIC is configured to offload protocol processing, performing protocol processing with respect to the data frame according to a state of the connection maintained in the NIC.

3. The NIC of claim 1, wherein the NIC is further configured to:
   for each data frame on which additional processing has been performed and that is a data frame destined for one of the virtual machines operated by the host and which is indicated as belonging to a connection for which the NIC is configured to offload protocol processing, performing protocol processing with respect to the data frame and the connection according to a state of the connection maintained in the NIC.

4. The NIC of claim 1, wherein:
   the NIC being configured to receive at least one data frame includes the NIC being configured to receive at least one data frame from either a peer via the network or from the virtual machines operated on the host.

5. The NIC of claim 1, wherein the NIC is configured to carry out filter processing such that a frame that would otherwise be caused to be provided to the host, via the host bus, for the host to perform the additional processing, is instead dropped.

6. The NIC of claim 5, wherein the NIC is configured to carry out filter processing at least in part based on rules that are configurable by the additional processing being performed on the host.

7. A network interface controller (NIC) configured to couple a host to a network, the NIC coupled to the host via a host bus, and the host configured to operate a plurality of virtual machines, the NIC including a data frame processing pipeline configured to:
   receive at least one data frame, the at least one data frame including at least a source network address and indication of at least one destination network address,
   based on an indication in the data frame, determine if the received data frame is a frame on which additional processing should occur;
   based on a result of the determining step, cause the frame to be provided to the host, via the host bus, for the host to perform the additional processing; and
   receive, via the host bus, the frame on which additional processing has been performed and provide the frame to a destination based on the indication of the at least one destination address.

8. The NIC of claim 7, wherein the data frame processing pipeline of the NIC is further configured to:
   for each received data frame that is a data frame received from one of the virtual machines operated by the host and which is indicated as belonging to a connection for which the NIC is configured to offload protocol processing, performing protocol processing with respect to the data frame according to a state of the connection maintained in the NIC.

9. The NIC of claim 7, wherein the data frame processing pipeline of the NIC is further configured to:
   for each data frame on which additional processing has been performed and that is a data frame destined for one of the virtual machines operated by the host and which is indicated as belonging to a connection for which the NIC is configured to offload protocol processing, performing protocol processing with respect to the data frame and the connection according to a state of the connection maintained in the NIC.

10. The NIC of claim 9, wherein:
    the NIC is further configured to add, after the performing of the protocol processing, the indication in the data frame, on which the determining is based, to at least some of the data frames that originate from a virtual machine that is not indicated as a trusted virtual machine.

11. The NIC of claim 7, wherein:
    the source network address is an original source network address; and
    the frame on which additional processing has been performed, received via the host bus, indicates the original source network address as a source network address.

12. The NIC of claim 7, wherein:
    the indication in the data frame on which the determining is based is an indication of an origin of the data frame.

13. The NIC of claim 7, wherein:
    the NIC is further configured to add the indication in the data frame, on which the determining is based, to at least some of the data frames that originate from a virtual machine that is not indicated as a trusted virtual machine.

14. The NIC of claim 13 wherein:
    for each received data frame that is a data frame received from one of the virtual machines operated by the host and which is indicated as belonging to a connection for which the NIC is configured to offload protocol processing, performing protocol processing with respect to the data frame according to a state of the connection maintained in the NIC.

15. The NIC of claim 14, wherein:
    the NIC is configured to add the indication in the data frame after the offload protocol processing is performed with respect to the data frame.

16. The NIC of claim 13, wherein:
    firmware in the NIC is configured to mark the data frame as a data frame for which the indication is to be added; and
    the NIC is further configured to, during protocol offload processing of the data frame, detect that the data frame has been marked and to add the indication to the protocol processed data frame.

17. The NIC of claim 13, wherein:
the indication which the NIC is configured to add in the data frame is a control tag.

18. The NIC of claim 17, wherein the control tag is an oVLAN tag.

19. The NIC of claim 13, wherein:
the indication which the NIC is configured to add in the data frame is an Ethernet header that indicates a destination on the host to perform the intrusion detection processing.

20. The NIC of claim 7, wherein:
the NIC being configured provide the frame to a destination based on the indication of the at least one destination address includes the NIC being configured to determine whether to provide the frame to multiple destinations based on the indication of the at least one destination address.

21. The NIC of claim 20, wherein:
the NIC is further configured to, based on a result of the determination of whether to provide the frame to multiple destinations, replicate the frame and utilize the processing pipeline to provide the replicated frames to the multiple destinations.

22. The NIC of claim 7, wherein the NIC is configured to carry out filter processing such that a frame that would otherwise be caused to be provided to the host, via the host bus, for the host to perform the additional processing, is instead dropped.

23. The NIC of claim 22, wherein the NIC is configured to carry out filter processing at least in part based on rules that are configurable by the additional processing being performed on the host.

24. A network interface controller (NIC) configured to couple a host to a network, the NIC coupled to the host via a host bus, and the host configured to operate a plurality of virtual machines, the NIC configured to:
receive at least one data frame, the at least one data frame including at least a source network address and indication of at least one destination network address,
determine if the received data frame is a frame on which additional processing should occur;
based on a result of the determining step, cause the frame to be provided for additional processing prior to providing the frame to a destination; and
receive the frame on which additional processing has been performed and steer the frame to the destination based on the at least one destination address.

25. The NIC of claim 24, wherein the NIC is further configured to:
for each received data frame that is a data frame received from one of the virtual machines operated by the host and which is indicated as belonging to a connection for which the NIC is configured to offload protocol processing, performing protocol processing with respect to the data frame according to a state of the connection maintained in the NIC.

26. The NIC of claim 24, wherein the NIC is further configured to:
for each data frame on which additional processing has been performed and that is a data frame destined for one of the virtual machines operated by the host and which is indicated as belonging to a connection for which the NIC is configured to offload protocol processing, performing protocol processing with respect to the data frame and the connection according to a state of the connection maintained in the NIC.

27. The NIC of claim 24, wherein:
the NIC being configured to receive at least one data frame includes the NIC being configured to receive at least one data frame from either a peer via the network or from the virtual machines operated on the host.

28. The NIC of claim 24, wherein the NIC is configured to carry out filter processing such that a frame that would otherwise be caused to be provided to the host, via the host bus, for the host to perform the additional processing, is instead dropped.

29. The NIC of claim 24, wherein the NIC is configured to carry out filter processing at least in part based on rules that are configurable by the additional processing being performed on the host.

* * * * *